United States Patent [19]

Hayakawa et al.

[11] Patent Number: 5,484,276
[45] Date of Patent: Jan. 16, 1996

[54] CURING APPARATUS FOR MOLDING COMPOUND

[75] Inventors: Yuzo Hayakawa, Takarazuka; Masahiro Hakotani, Yamatokoriyama, both of Japan

[73] Assignee: Takeda Chemical Industries, Ltd., Osaka, Japan

[21] Appl. No.: 154,401

[22] Filed: Nov. 18, 1993

[30] Foreign Application Priority Data

Nov. 20, 1992 [JP] Japan ..................... 4-312318

[51] Int. Cl.[6] ........................... B29C 43/22; B29C 43/52
[52] U.S. Cl. ........................ 425/343; 425/374; 425/394; 425/446; 425/DIG. 127
[58] Field of Search ..................................... 425/325, 327, 425/394, 395, 446, 363, 374, 335, 343, DIG. 127

[56] References Cited

U.S. PATENT DOCUMENTS

| | | | |
|---|---|---|---|
| 1,873,279 | 8/1932 | Brown | 425/335 |
| 2,874,751 | 2/1959 | Norton | 425/394 |
| 3,883,285 | 5/1975 | De Mets | 425/335 |
| 3,897,189 | 7/1975 | Thompson | 425/374 |
| 3,981,666 | 9/1976 | Wadman | 425/335 |
| 4,216,179 | 8/1980 | Lamberts et al. | 425/335 |
| 4,302,167 | 11/1981 | Maffeis et al. | 425/394 |
| 4,645,632 | 2/1987 | Bottger et al. | 425/335 |
| 4,647,417 | 3/1987 | Bottger et al. | 425/335 |
| 4,956,140 | 9/1990 | Rolles et al. | 425/394 |
| 5,352,110 | 10/1994 | Hayakawa et al. | 425/335 |

*Primary Examiner*—James P. Mackey
*Attorney, Agent, or Firm*—Wenderoth, Lind & Ponack

[57] ABSTRACT

An apparatus for curing a sheet molding compound which comprises at least one pair of molds disposed along a path of transport of the sheet molding compound. The molds defines a cavity therebetween for passage of the sheet molding compound, which has been generally semi- cured and shaped by a shaping apparatus to a predetermined shape, to heat the generally semi-cured sheet molding compound. At least one of the molds is in the form of a movable mold effective to vary a cross-sectional shape of the cavity to follow a thermal expansion and shrinkage which take place in the sheet molding compound during a curing process.

17 Claims, 6 Drawing Sheets

CURING APPARATUS FOR MOLDING COMPOUND

BACKGROUND OF THE INVENTION

1. Field of the Invention

The present invention relates generally to a curing apparatus for curing a molding compound and, more particularly, to the curing apparatus for curing a semi-cured sheet molding compound (such as SMC material or TMC material) prepared from unsaturated polyester resin or epoxy resin impregnated with reinforcement such as glass fibers, carbon fibers, etc. and filler, pigment agent, thickener, inner mold release and an additive such as, for example, high temperature curing agent, by heating the sheet molding compound after the latter has been shaped by a shaping apparatus to a required shape with the fibers oriented in a required direction if necessary.

2. Description of the Prior Art

The assignee of the present invention has suggested, in JP Laid-open Patent Publication No. 5-069450 published Mar. 23, 1993 (or EP-A1-0503554 published Sep. 16, 1992; U.S. appln. Ser. No. 849,662 filed Mar. 10, 1992; or Taiwan Patent Appln. No. 81101852 filed Mar. 11, 1992), a dry material molding method and a dry material of a compound material using a semi-cured, fiber-reinforced sheet molding compound such as SMC or TMC material for press-molding.

The molding apparatus referred to above comprises a plurality of rolls in combination with either a die mold or a corresponding number of die rolls positioned one above the other to define a transport passage therebetween. As the semi-cured sheet molding compound is transported through the transport passage between the rolls and the die mold or the die rolls, either the rolls or the die mold or die rolls, for example, the rolls, are moved repeatedly close towards and away from the die mold or die rolls to compress the sheet molding compound to a desired thickness so as to shape the sheet molding compound and also to orient the reinforcement fibers contained therein in a predetermined direction. The pressure applied from the rolls to the sheet molding compound to compress the latter is varied as the sheet molding compound travels through the transport passage and, for this reason, not only is control of the orientation of the reinforcement fibers contained in the sheet molding compound possible, but it is also possible to orient such reinforcement fibers to thereby avoid an arbitrary uneven flow of the material during the molding so that the molding compound having a desired or predetermined cross-sectional shape can be obtained.

The suggested molding apparatus includes a shaping apparatus comprising rolls and die rolls positioned one above the other for shaping the sheet molding compound, containing an additive such as a high temperature curing agent, at normal temperatures while the sheet molding compound is in a substantially semi-cured state. The molding apparatus also includes a heat curing apparatus for curing the shaped sheet molding compound. Thus, the suggested molding apparatus is featured in that the shaping and the curing are carried out separately but in succession, and the curing apparatus is operable merely to perform the curing.

The molding apparatus disclosed in the above mentioned prior application suggests two types of curing apparatus to be installed next to the shaping apparatus:

1) A die in the shaping apparatus is loaded into the curing apparatus while the molding compound is retained on the die, and the molding compound is cured by heating for a predetermined length of time by means of a heating means such as, for example, a heater or hot air device embedded in the molding apparatus.

Figure 12:
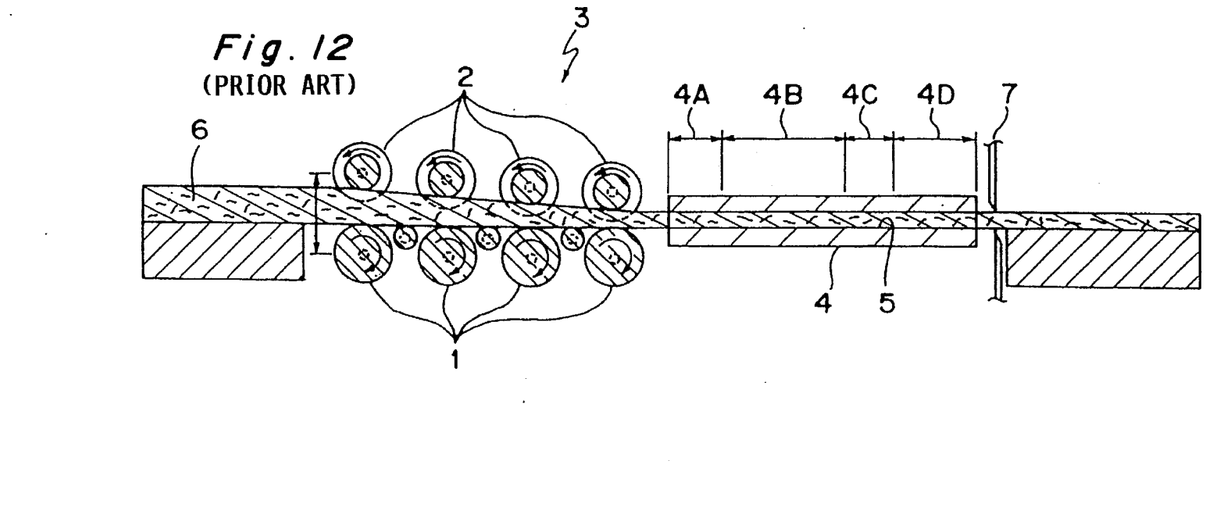
FIG. 12 is a schematic longitudinal sectional view showing a prior art molding apparatus.

2) As shown in FIG. 12 of the accompanying drawings and in JP Laid-open Patent Publication No. 5-069450 published Mar. 23, 1993 (or EP-A1-0503554 published Sep. 16, 1992; U.S. appln. Ser. No. 849,662 filed Mar. 10, 1992; or Taiwan Patent Appln. No. 81101852 filed Mar. 11, 1992), a curing apparatus 4 having a transport passage 5 of a cross-sectional shape complemental to that of the sheet molding compound 6 is installed preceding a cutting unit 7 and next to a shaping apparatus 3 comprising rolls 1 and die rolls 2 positioned one above the other. This curing apparatus 4 includes a guide zone 4A, a primary curing zone 4B, a secondary curing zone 4C and a third curing zone 4D defined therein in this order from an upstream end to a downstream end. Respective portions of the transport passage 5 in the guide and primary curing zones 4A and 4B are of a size sufficient to provide a clearance relative to an outer perimeter of the sheet molding compound defined by the shaping apparatus whereas a portion of the transport passage 5 in the third curing zone 4D is slightly undersized or slightly oversized relative to the outer perimeter of the sheet molding compound so as to accommodate a thermal characteristic of the sheet molding compound being treated.

Figure 11:
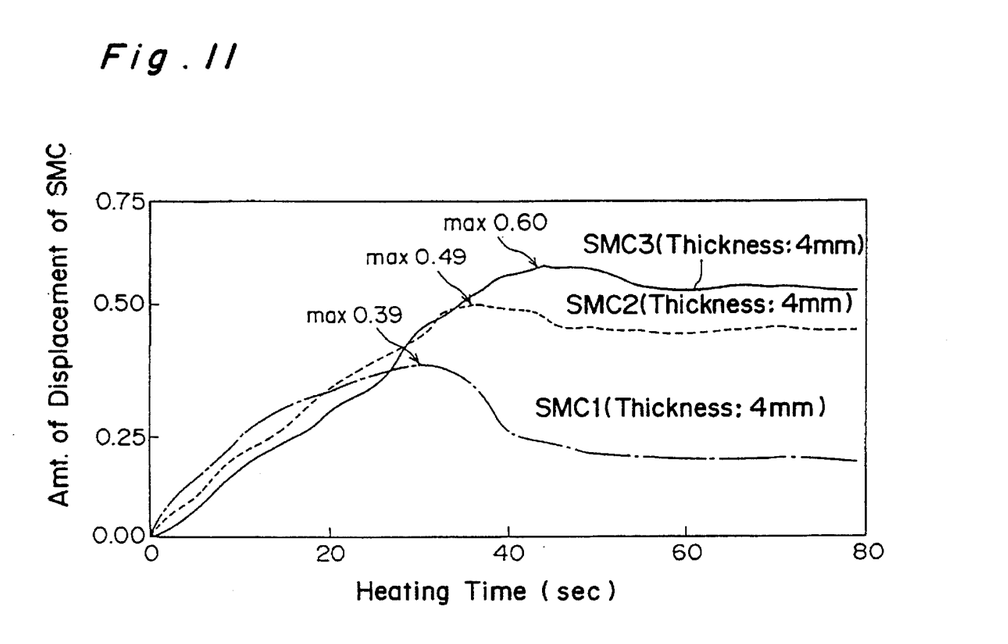
FIG. 11 is a graph showing a change in volume which takes place while an SMC compound is being cured.

The semi-cured sheet molding compound such as SMC material is, after having been shaped by the shaping apparatus to a desired shape, cured by heating. A series of experiments have, however, shown that, as shown in FIG. 11, during the curing treatment of the sheet molding compound, the latter tends to thermally expand and then shrink and the shrinkage will no longer take place after the sheet molding compound has been shrunken a predetermined quantity. As shown by solid, dotted and chain lines in the graph of FIG. 11, the amount of expansion and that of shrinkage vary with the type of the SMC material. In other words, the solid line indicates that the maximum amount of thermal expansion is 0.60 mm; the dotted line indicates that the maximum amount of thermal expansion is 0.49 mm; and the chain line indicates that the maximum amount of thermal expansion is 0.39 mm. Thus, the amount of thermal expansion is not uniform for all of the sheet molding compounds.

The apparatus suggested under (1) above is used to provide a product having predetermined length and cannot therefore be used for curing a long or continuous sheet molding compound.

Also, the apparatus suggested under (2) above cannot be operable where both of the coefficient of thermal expansion and the coefficient of thermal shrinkage vary since the cross-sectional shape of the transport passage through which the sheet molding compound is transported is fixed. Accordingly, in the case, for example, where the coefficient of thermal expansion is high as compared with the cross-sectional shape of the transport passage, an excessive load will act on the sheet molding compound, whereas in the case where the coefficient of thermal shrinkage is low as compared with the cross-sectional shape of the transport passage a molding face defining the transport passage will not contact the sheet molding compound resulting in not only an insufficient heating of the sheet molding compound, but also a failure to form a smooth exterior surface of the eventually cured molding compound.

SUMMARY OF THE INVENTION

The present invention has been developed in view of the foregoing problems and has for its object to provide an improved curing apparatus for curing a continuous sheet molding compound, which apparatus is effective to accommodate the thermal expansion and shrinkage of the sheet molding compound during the curing process to thereby to accomplish an optimum heating and also to provide an authentically excellent surface appearance of the eventually cured molding compound.

To this end, the present invention in one aspect provides an apparatus for curing a sheet molding compound which comprises at least one pair of molds disposed along a path of transport of the sheet molding compound. The molds define a cavity therebetween for passage of the sheet molding compound, which has been generally semi-cured and shaped by a shaping device to a predetermined shape, to heat the generally semi-cured sheet molding compound. At least one of the molds is in the form of a movable mold effective to vary a cross-sectional shape of the cavity to follow a thermal expansion and shrinkage which take place in the sheet molding compound during a curing process.

According to another aspect of the present invention, the curing apparatus comprises at least first, second and third curing zones each including upper and lower molds supported one above the other. The first curing zone is positioned next to the shaping apparatus to receive the sheet molding compound while the second curing zones is positioned intermediate between the first and third curing zones. Each of the curing zones has a cavity defined between the associated upper and lower molds so that the cavities in the first to third curing zones may cooperate to define a transport passage in the curing apparatus for continuous transportation of the sheet molding compound therethrough. The cavity in the first curing zone is preferably tapered towards the cavity in the second curing zone. One of the upper and lower molds in the second curing zone is supported for movement towards and away from the other of the upper and lower molds in the second curing zone.

The curing of the molding compound may be carried out by heating it by means of a heating means in the molds, at normal temperature where a normal temperature curing agent is mixed in the molding compound, or by radiation with rays of light. All of these techniques may be employed in the case where it is desired to cure the molding compound within the molds and are conveniently employed where during the curing process the molding compound undergoes a change in volume as a result of thermal expansion and thermal shrinkage.

Preferably, the cavity in the first molding zone has entry and exit ends adjacent to and remote from the shaping apparatus, respectively, the entry end of the cavity in the first molding zone being of a cross-sectional shape adjusted to provide a clearance relative to the sheet of molding compound, the exit end of the cavity in the first curing zone being of a cross-sectional shape substantially similar to or slightly larger than the design cross-sectional size of the sheet molding compound.

The first curing zone is a zone where the curing of the semi-cured sheet molding compound is initiated and the extent to which the sheet molding compound is expanded thermally is small, for example, about 0.2mm at the entry end of the first curing zone. As described above, the cross-sectional shape of the transport passage at the entry end of the first curing zone is of a size sufficient to provide the clearance relative to the sheet molding compound so that the latter can smoothly be introduced into the remaining portion of the transport passage. On the other hand, the cross-sectional shape of the transport passage in the first curing zone progressively decreases from the entry end towards the exit end of the first curing zone to cause the molding face to contact the sheet molding compound being cured so that the cross-sectional shape of the sheet molding compound may eventually represent substantially that of the completely cured molding compound or be slightly larger than the completely cured molding compound.

Due to the presence of the clearance at the entry end of the first curing zone, the sheet molding compound is cured by radiation heat in the case of the use of a heating means and, as the clearance decreases, the sheet molding compound is sufficiently heated in contact with the molding face. As hereinbefore discussed, other than the use of the heating means, curing at normal temperature or the use of any other heating means may be employed to facilitate the curing.

The second curing zone is a zone where the thermal expansion of the sheet molding compound reaches a maximum thermal expansion followed by a thermal shrinkage. In this second curing zone, the sheet molding compound has attained a rigidity and, therefore, when the sheet molding compound contacts the molds while having been thermally expanded, a friction is developed therebetween to an extent that the sheet molding compound is no longer moved merely relying on a force with which the sheet molding compound is transported. Therefore, in the second curing zone, one of the upper and lower molds is supported for movement relative to the other of the upper and lower molds so that the movable mold can be displaced relative to the fixed mold to accommodate the thermal expansion of the sheet molding compound, allowing the sheet molding compound to slidingly contact the molding face of the movable mold at all times.

Preferably, the movable mold in the second curing zone is urged under a low or null pressure towards the cavity in the second curing zone so that the movable mold can be displaced in accordance with a change in volume of the molding compound material without substantially applying any pressure to the sheet molding compound to keep the sheet molding compound in sliding contact with the molding face of the movable mold. The molding face of the movable mold does preferably contact one of the opposite surfaces of the sheet molding compound which eventually provides an exterior surface, so that the one of the surfaces of the sheet molding compound can be smoothed to provide the authentically excellent surface appearance.

Preferably, the fixed mold in the second curing zone includes a plurality of juxtaposed support rollers, top line portions of the juxtaposed support rollers lying in a common plane along which the sheet molding compound moves. These support rollers may be elastically yieldably supported by means of a corresponding number of elastic elements. With this system, the friction developed between the sheet molding compound and the fixed mold can be minimized, and this is particularly true where the elastic elements are employed to elastically yieldably support the support rollers.

A portion of the curing apparatus adjacent the exit end of the second curing zone is the third curing zone in which the sheet molding compound having been thermally shrunken no longer undergoes any change in shape and is maintained at a substantially constant shape. Therefore, the upper and lower molds in this third curing zone are adjusted so that the cavity in the third curing zone represents a uniform cross-sectional shape over the length thereof while providing a slight clearance relative to the substantially cured sheet molding compound being slid through the cavity in the third curing zone.

It is to be noted that the use of the third curing zone is not always essential and the second curing zone may extend to the exit opening of the curing apparatus.

Preferably, a heating means may be embedded in any one of the upper and lower molds in any one of the first to third curing zones, in combination with a temperature control means for controlling the heating means so that the sheet molding compound being transported through the transport passage can be cured in a controlled manner.

The sheet molding compound which may be employed in the practice of the present invention may be a SMC (sheet molding compound) material which contains fiber reinforced resins and which is prepared by mixing a resinous compound, comprising unsaturated polyester resin or epoxy resin mixed with additives such as filler material, thickener, release agent, dyes and others. The compound is impregnated with reinforcement fibers such as chopped strands, and then the fiber reinforced resinous compound is sandwiched between polyethylene sheets to provide a laminar sheet and is finally the laminar sheet is heated to a maturing temperature (e.g., 40° C.) to increase the viscosity of the resinous compound to thereby render it non-viscous.

The curing apparatus of the present invention is conveniently used in association with the shaping apparatus disclosed in the previously mentioned publication.

As hereinbefore indicated, in the curing apparatus of the present invention, since the cavity in the first curing zone is so adjusted as to have a cross-sectional shape sufficient to provide a clearance relative to the sheet molding compound, the latter can be smoothly introduced into the transport passage in the curing apparatus. Also, since the clearance can be progressively decreased, the heating by radiation can be followed by contact heating and, therefore, the sheet molding compound can be sufficiently cured by heating.

Also, in the second curing zone in which the sheet molding compound has gained a sufficient rigidity and the amount of change in volume resulting from the thermal expansion and shrinkage of the sheet molding compound is large, the movable mold is displaced to accommodate the thermal expansion and shrinkage of the sheet molding compound and, therefore, no excessive frictional force is developed between it and the molds, allowing a smooth transport of the sheet molding compound. Also, since no excessive load is imposed on the sheet molding compound during the thermal expansion taking place, the orientation of the reinforcement fibers in the sheet molding compound can be maintained as given ideally during the shaping process. In other words, during curing of the sheet molding compound by heating, the orientation of the reinforcement fibers is not damaged.

BRIEF DESCRIPTION OF THE DRAWINGS

This and other objects and features of the present invention will become clear from the following description taken in conjunction with preferred embodiments thereof with reference to the accompanying drawings, in which like parts are designated by like reference numerals and in which:

FIG. 8 is a cross-sectional view taken along the line C—C in FIG. 2;

DETAILED DESCRIPTION OF THE EMBODIMENT

Figure 1:
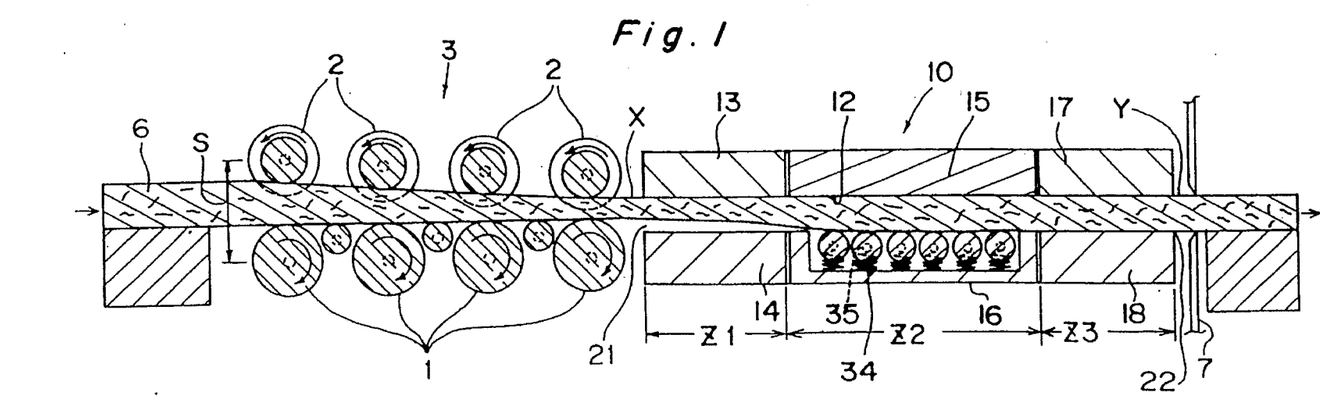
FIG. 1 is a schematic longitudinal sectional view of a curing apparatus according to a preferred embodiment of the present invention.

Referring first to FIG. 1, a curing apparatus embodying the present invention is shown in the form of a curing apparatus 10 and installed in any known molding apparatus, such as shown in FIG. 12, at a curing site downstream of a shaping apparatus 3 and upstream of a cutting unit 7 with respect to the direction in which a continuous sheet molding compound 6 of a generally rectangular cross-section is transported therethrough. The shaping apparatus 3 of a type employed in the prior art molding apparatus shown in FIG. 12, includes a lower group of juxtaposed rolls 1 and a upper group of juxtaposed die rolls 2, the upper and lower groups of the rolls 1 and 2 being positioned one above the other so as to define a transport passage through which the sheet molding compound 6 is transported towards the curing apparatus 10.

The curing apparatus 10 has a guide passage 21 having a cross-sectional shape complementary to that of the sheet molding compound 6 defined therein with one end thereof communicated with the transport passage in the shaping apparatus 3. This curing apparatus 10 has first, second and third curing zones Z1, Z2 and Z3 defined therein in the order from an upstream side towards a downstream side thereof. An upstream portion of the guide passage 21 encompassed by the first curing zone Z1 is of a size sufficient to provide a clearance around a cross-sectional size of the rectangular cross-sectioned sheet molding compound 6, while a downstream portion of the guide passage 21 encompassed by the third curing zone Z3 is of a size either substantially equal to or slightly oversized relative to the cross-sectional size of the sheet molding compound depending on a thermal characteristic of the sheet molding compound 6.

The shaping apparatus 3 so far shown in FIG. 1 is of a four-stage rolling design wherein the upper group of the four rolls 1 and the lower group of the four die rolls 2 are employed in paired fashion. The lower die rolls 1 are drivingly coupled with a common drive mechanism while the upper rolls 2 are rotatably supported. The lower and upper groups of the rolls 1 and 2 are so arranged that the distance of spacing S between the lower and upper groups of the rolls 1 and 2 progressively decreases from a first shaping stage towards a final shaping stage conforming to the direction of transport of the sheet molding compound 6.

Figure 3:
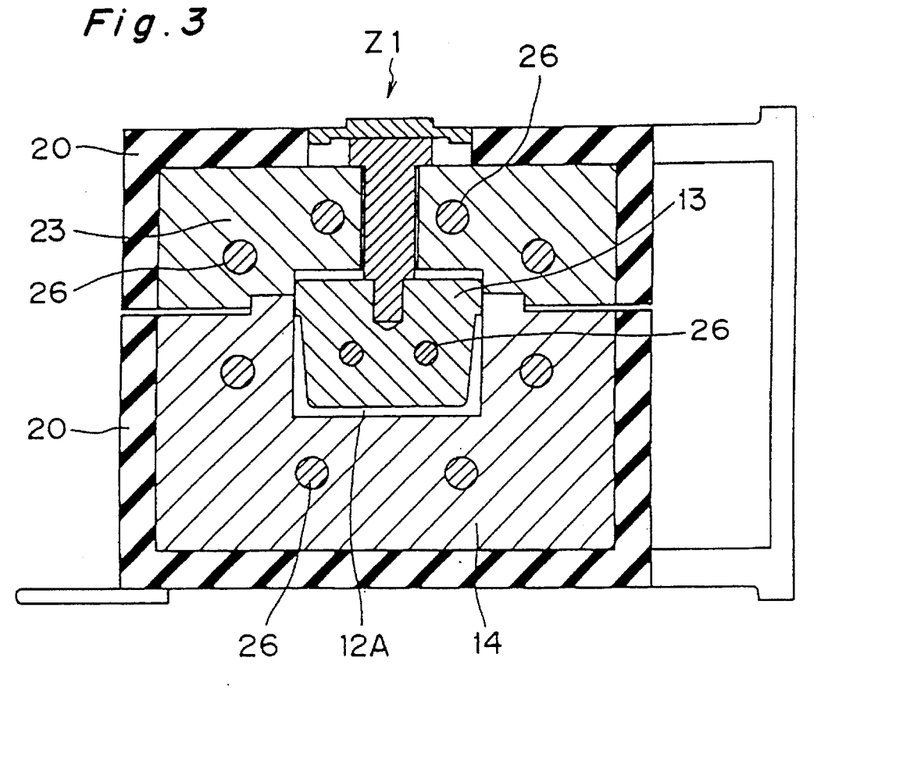
FIG. 3 is a cross-sectional view taken along the line A—A in FIG. 2.

The sheet molding compound 6 is preferably in the form of an SMC material which is a semi-cured molding material of unsaturated polyester resin impregnated with reinforcement fibers. As this sheet molding compound 6 is transported through the transport passage in the shaping apparatus 3, the sheet molding compound 6 is stepwisely compressed by the rolls 1 and 2 at normal temperatures so as to represent a predetermined cross-sectional shape (e.g., complemental to the shape of a generally U-sectioned cavity 12A in a mold assembly as shown in FIG. 3).

The curing apparatus 10 has an entry end X and an exit end Y defined adjacent the shaping apparatus 3 and the cutting unit 7, respectively, and also has the first, second and third curing zones Z1, Z2 and Z3 as described above. This curing apparatus 10 includes upper and lower molds 13 and 14, 15 and 16, or 17 and 18 in each of the upstream, intermediate and downstream portions thereof, which molds are closely positioned relative to each other in a direction conforming to the direction of transport of the sheet molding compound The guide passage 12 extends from the entry end X to the exit end Y of the curing apparatus 10 and is delimited between the upper molds 13, 15 and 17 and the lower molds 14, 16 and 18.

Figure 2:
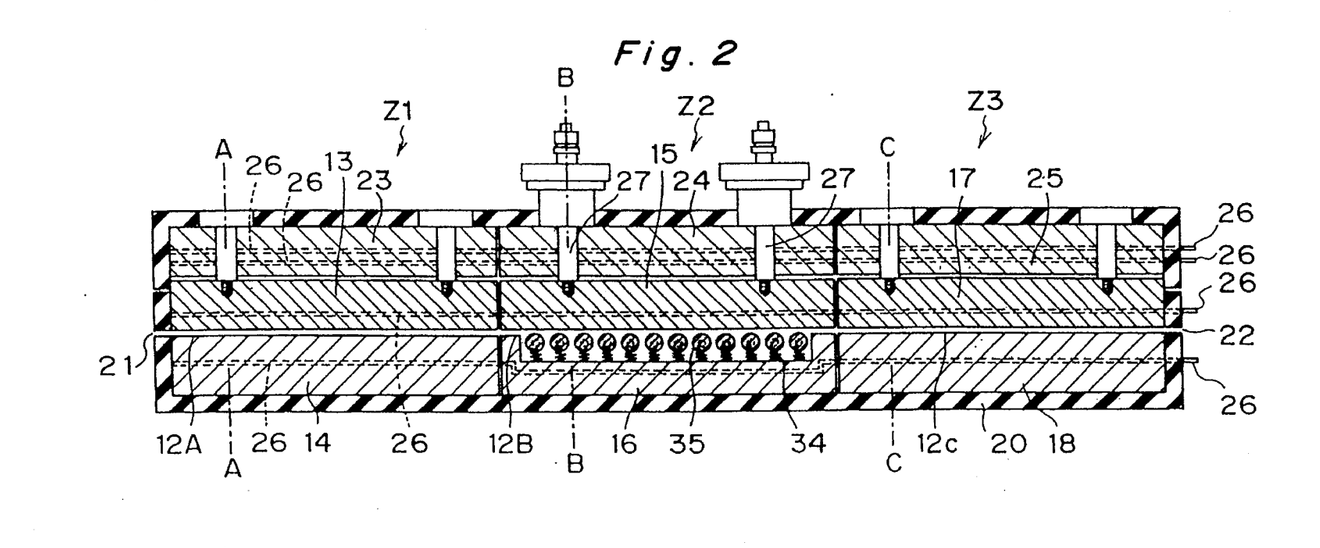
FIG. 2 is a longitudinal sectional view of the curing apparatus.

In the curing apparatus 10 shown in FIG. 2, the upper and lower molds 13 and 14 in the first curing zone Z1 and the upper and lower molds 17 and 18 in the third curing zone Z3 are fixed in position, whereas in the second curing zone Z2 the upper mold 15 is supported for movement close towards and away from the lower mold 16 which is fixed in position.

More specifically, as shown in FIGS. 2 to 9, all of the upper and lower molds forming the curing apparatus 10 are housed within a mold enclosure (or mold housing) 20 made of heat insulating material. A portion of the mold enclosure 20 adjacent the entry end X is formed with an entry opening 21 while a portion of the mold enclosure 20 adjacent the exit end Y is formed with an exit opening 22, the entry and exit openings 21 and 22 leading to and from the guide passage 12, respectively.

Figure 4:
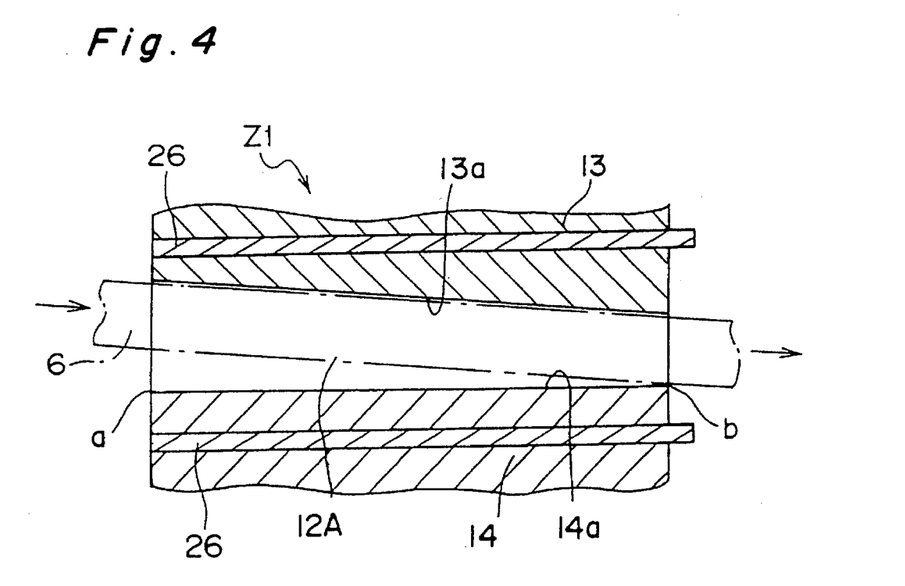
FIG. 4 is a fragmentary longitudinal sectional view, on an enlarged scale, of a portion of the curing apparatus.

The lower molds 14, 16 and 18 of the curing apparatus 10 are fixed to the mold enclosure 20. However, the upper molds 13 and 17 paired respectively with the lower molds 14 and 18 are fixed to associated upper mold holders 23 and 25 fixedly secured to the mold enclosure 20 while the upper mold 15 paired with the lower mold 16 is supported by an upper mold holder 24, fixedly secured to the mold enclosure 20, for movement up and down, that is, in a direction towards and away from the associated lower mold As best shown in FIGS. 3 and 4, the first curing zone Z1 includes the upper mold 13 fixedly connected to the upper mold holder 23. This upper mold 13 cooperates with the lower mold 14 to define a generally U-sectioned cavity 12A as best shown in FIG. 3, the cavity 12A having a size uniform over the entire length thereof from an entry end a to an exit end b thereof since the upper and lower molds 13 and 14 are fixed in position.

As best shown in FIG. 4, over the length of the upper mold 13 from the entry end a to the exit end b, the upper mold 13 has a molding face 13a which is inclined towards a mating molding face 14a of the lower mold 14 so as to progressively decrease the clearance between it and the sheet molding compound 6 being transported. This can be accomplished by using the upper mold 13 having a thickness progressively increasing from the entry end a towards the exit end b as best shown in FIG. 4.

The cross-sectional shape of a portion of the cavity 12A adjacent the entry end a is so chosen as to have a size larger than the cross-section of the sheet molding compound which has been shaped by the shaping apparatus 3, so that a sufficient clearance can be created. Therefore, the semi-hardened sheet molding compound 6 shaped by the shaping apparatus 3 can smoothly be inserted into the cavity 12A with no difficulty.

On the other hand, the cross-sectional shape of another portion of the cavity 12A adjacent the exit end b is so chosen as to be substantially equal to or slightly larger than a design cross-sectional size of the sheet molding compound 6 so that the sheet molding compound 6 approaches the molding faces 13a and 14a.

Each of the upper and lower molds 13 and 14 and the upper mold holder 23 has a plurality of sheath heaters 26 embedded therein and spaced a predetermined distance from each other. These sheath heaters 26 are used to heat the upper and lower molds 13 and 14 and the upper mold holder 23 to a predetermined temperature. It is, however, to be noted that, in place of electric heaters such as the sheath heaters 26, any suitable heating means such as a heating jacket for circulating a pressurized steam or heated oil therethrough may be employed.

Figure 5:
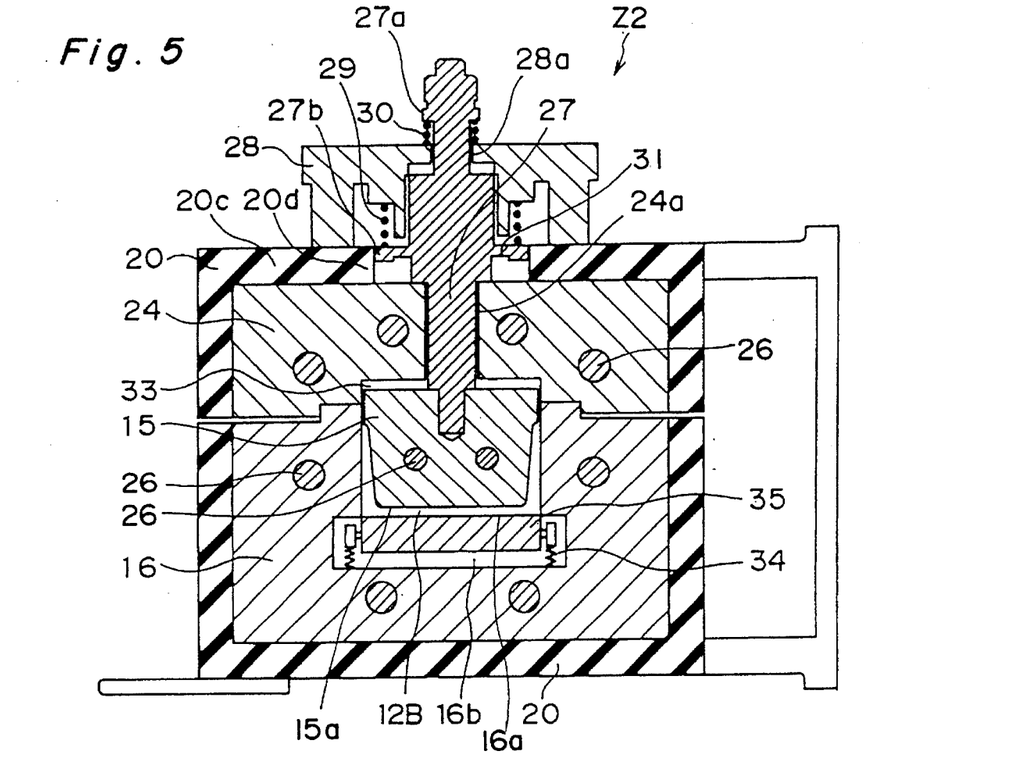
FIG. 5 is a cross-sectional view taken along the line B—B in FIG. 2.
Figure 6:
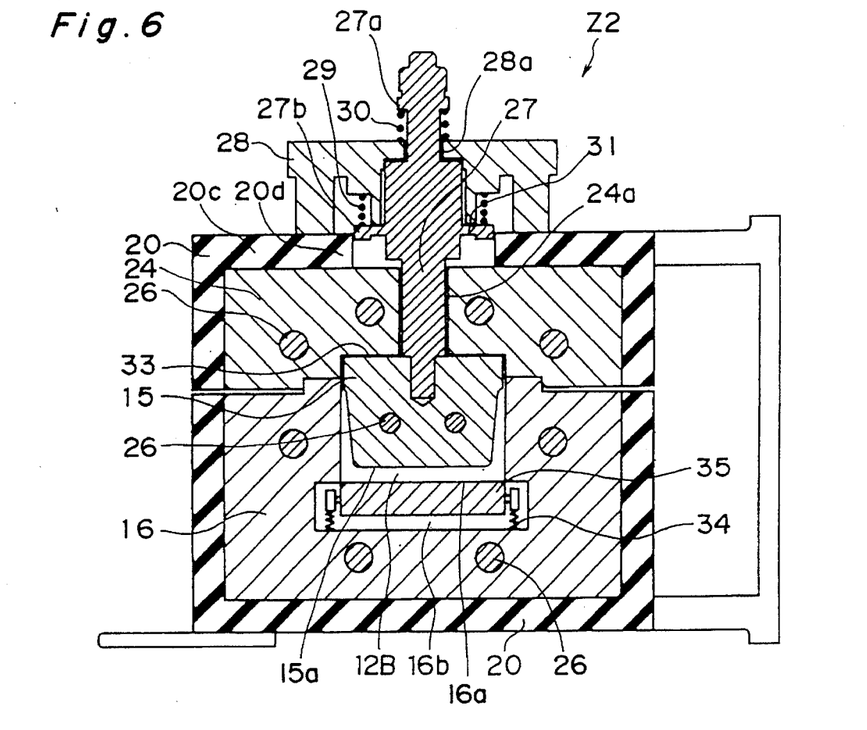
Figure 7:
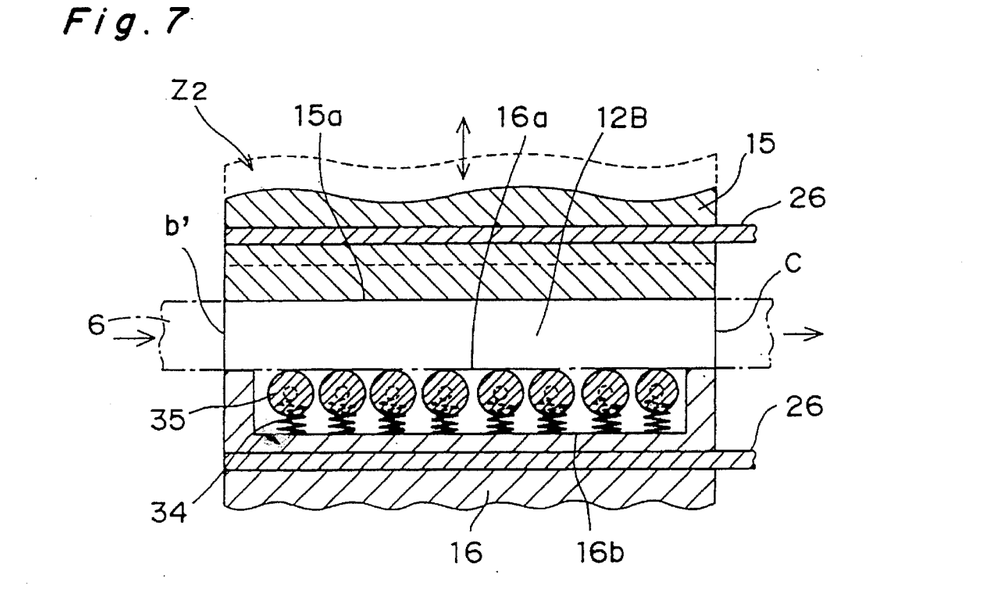
FIG. 7 is a fragmentary longitudinal sectional view showing a portion of FIG. 5 on an enlarged scale.

As best shown in FIGS. 5 to 7, in the second curing zone Z2, while the lower mold 16 is fixed to the mold enclosure 20, the upper mold 15 is not fixed to the upper mold holder 24, but is secured to lower ends of respective support rods 27 so that the upper mold 15 can be selectively lowered and elevated relative to the associated lower mold 16 and in a direction towards and away from the upper mold holder 24. Each of the support rods 27 slidably extends through bearing holes 24a and 20d formed in the upper mold holder 24 and an upper wall 20c of the mold enclosure 20, respectively. An upper end of each support rod 27 protruding outwardly from the upper wall of the mold enclosure 20 further extends slidably through a bearing hole 28a defined in a support plate 28 and is integrally formed with a radially outwardly extending collar 27a. A bearing 31 of each support rod 27 below the support plate 28 and situated within the bearing hole 20d in the upper wall 20c of the mold enclosure 20 is also formed with a radially outwardly extending collar 27b.

Each support rod 27 has a pair of balancing coil springs 29 and 30 mounted therearound. The balancing coil spring 29 is interposed between the collar 27b in the bearing 31 situated within the bearing hole 20d in the upper wall 20c of the mold enclosure 20 and an undersurface of the support plate 28, while the balancing coil spring 30 is interposed between the collar 27a at the upper end of the respective support rod 27 and an upper surface of the support plate 28. The balancing coil spring 30 is operable to urge the respective support rod 27 upwardly together with the upper mold 15, whereas the balancing coil spring 29 is operable to urge the respective support rod 27 downwardly together with the upper mold 15. The balancing coil springs 29 and 30 are so counterbalanced that the upper mold 15 can be cushioned up and down together with the support rods 27 relative to the support plate 28 and, at the same time, movable in a direction towards and away from the associated lower mold 16.

With the support rods 27 retained by the balancing coil springs 29 and 30 in the manner described above, the upper mold 15 secured to the lower ends of the support rods 27 is normally biased towards the associated lower mold 16 under a low pressure (for example, 4,900 Pa in the illustrated embodiment). In other words, the balancing coil springs 29 and 30 are so chosen as to exert a low pressure of, for example, 4,900 Pa with which the upper mold 15 can be biased towards the associated lower mold 16. Accordingly, when the sheet molding compound 6 being passed between the upper and lower molds 15 and 16 undergoes a thermal expansion, the upper mold 15 can be shifted upwardly together with the support rods 27 to such a position as shown in FIG. 6 to thereby accommodate the thermal expansion of the sheet molding compound 6. The balancing coil spring 30 may be of a type having a relatively large diameter and also having a spring constant of 1.58 kgf/mm and the balancing coil spring 29 may be of a type having a relatively small diameter and also having a spring constant of 1.31 kgf/mm, the spring constant of the system of these springs being 2.89 kgf/mm.

Since each movable mold is supported by the above two systems and Since the spring constant of each movable mold is 5.78 kgf/mm (=2.89×2) and the area of projection surface of each movable mold is (75 mm×300 mm), a 1 mm displacement results in a pressure of 0.025 kgf/cm$^2$[=(5.78× 1.0)/(7.5×30)] or 2,520 Pa.

It is to be noted that the above described biasing means may not be always limited to double springs, but any means effective to permit the upper mold 15 to move up or down in response to expansion or contraction of the sheet molding compound 6 may be employed. In a normal state, however, a gap 33 as shown in FIG. 5 is formed between an upper face of the upper mold 15 and the upper mold holder 24 to accommodate a stroke of movement of the upper mold 15 so that the cross-section of a cavity 12B formed between molding faces 15a and 16a of the respective upper and lower molds 15 and 16 varied.

As best shown in FIG. 7, the upper mold 15 in the second curing zone Z2 has a cross-sectional shape uniform over the entire length thereof from an entry end b' to an exit end c and, therefore, the cavity 12B formed between the molding faces 15a and 16a of the upper and lower molds 15 and 16 has a cross-sectional shape similarly uniform over the entire length thereof from the entry end b' to the exit end c. It is to be noted that, where the length of the second curing zone Z2 in a direction conforming to the direction of transport of the sheet molding compound 6 is small, a one point support system for the support of the upper mold 15, that is, the use of a single support rod 27 at a location intermediate of the length of the upper mold 15, may be sufficient. On the contrary thereto, where the second curing zone Z2 has a substantial length, two or more support rods 27 may be employed.

The lower mold 16 is formed with a generally U-sectioned rectangular recess 16b for accommodating a plurality of juxtaposed support rollers 35 as shown in FIGS. 5 to 7 with their longitudinal axes lying perpendicular to the lengthwise direction of the lower mold 16. The support rollers 35 are accommodated within the recess 16b with springs 34 interposed between the bottom of the recess 16b and the support rollers 5, the springs 34 being so chosen as to permit respective top points on the support rollers 35 to lie on the molding face 16a. Accordingly, as the sheet molding compound 6 being passed through the cavity 12B undergoes a thermal expansion, the support rollers 35 are displaced downwardly against the associated springs 34 to accommodate the thermal expansion of the sheet molding compound 6.

It is to be noted that, in the illustrated embodiment, the lower mold 16 has been shown and described as formed with the-single rectangular recess 16b for accommodating the juxtaposed support rollers 35. However, the lower mold 16 may be formed with a plurality of recesses, one for each support roller 35. Alternatively, the support rollers 35 may be substantially embedded in the lower mold 16 with their top portions exposed outwardly so as to lie on the molding face 16a. It is also to be noted that the position where the support rollers 35 are installed and/or the number of the support rollers 35 may be chosen in consideration of the magnitude of displacement at a location where the thermal expansion of the sheet molding compound 6 is maximized and the length of time over which the maximum thermal expansion of the sheet molding compound 6 is retained.

It is again pointed out that, although the support rollers 35 may not always be supported on the springs 34, friction can be considerably-reduced when the support rollers 35 are supported on the springs 34.

Even in the second curing zone Z2, each of the upper and lower molds 15 and 16 and the upper mold holder 24 has a plurality of sheath heaters 26 embedded therein and spaced a predetermined distance from each other for heating the upper and lower molds 15 and 16 and the upper mold holder 24 to a predetermined temperature.

Figure 8:
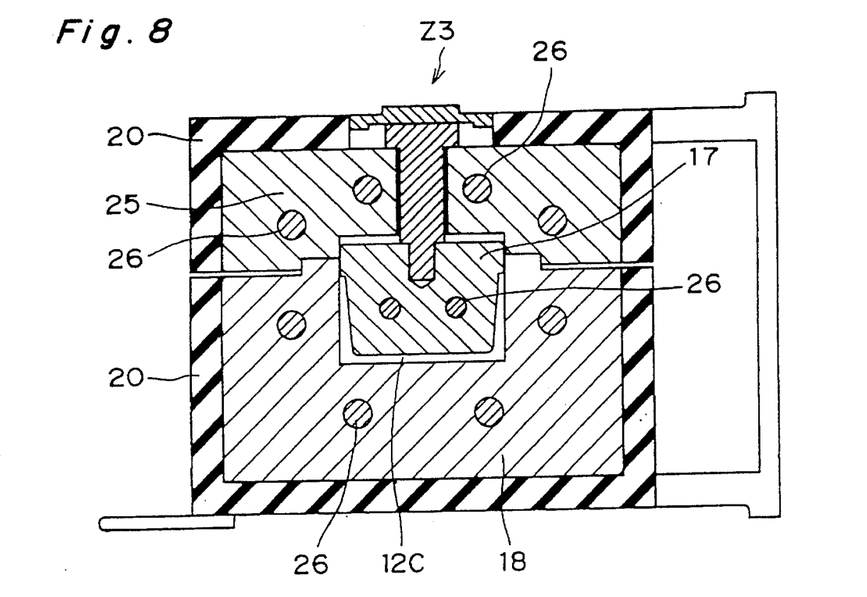
FIG. 8 is a view similar to FIG. 5, showing a movable mold having been moved.
Figure 9:
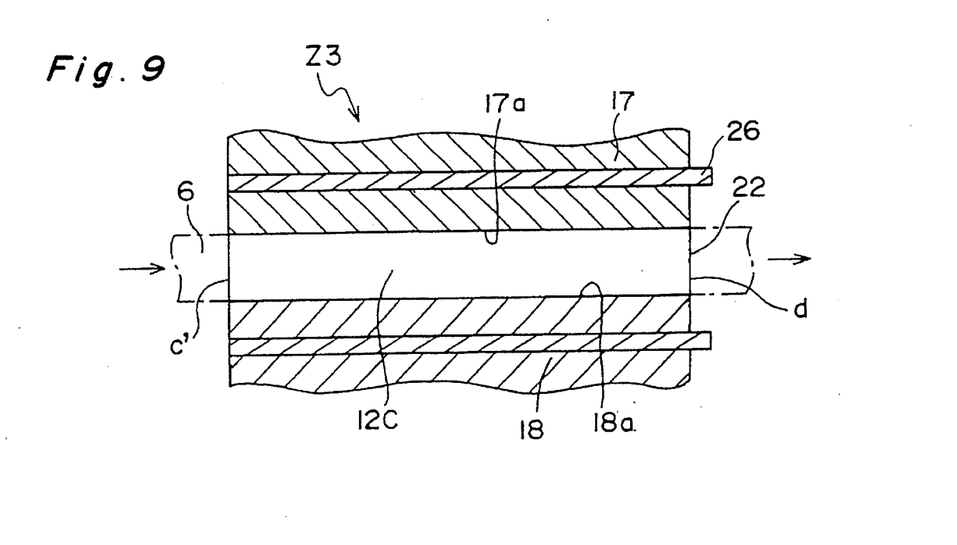
FIG. 9 is a fragmentary longitudinal sectional view

As best shown in FIGS. 8 and 9, in the third curing zone Z3, and upper mold 17 is fixed to the upper mold holder 25 in a manner similar to the upper mold 13 in the first curing zone Z1. This upper mold 17 in the third curing zone Z3 has a shape uniform over the length thereof from an entry end c' to an exit end d and, hence, a cavity 12C defined between respective molding faces 17a and 18a of the upper and lower molds 17 and 18 has a shape uniform over the length thereof. The cross-section of the cavity 12C lying in a plane transverse to the lengthwise direction thereof is so chosen as to be substantially equal to or slightly larger than the design cross-section of the substantially completely cured sheet molding compound 6 to thereby allow the latter to move through the cavity 12C while slidingly contacting the molding faces 17a and 18a. It is to be noted that sliding contact between the cured sheet molding compound 6 and the molding faces 17a and 18a may not always be essential.

The curing of the sheet molding compound (SMC material) 6 by heating it within the curing apparatus 10 of the above described construction will now be described.

Referring to FIG. 1, a substantially semi-cured SMC sheet 6 having a predetermined thickness is transported in between the rolls 1 and the die rolls 2 of the shaping apparatus 3. As the SMC sheet 6 is transported through the shaping apparatus 3, the SMC sheet 6 is stepwisely compressed to a generally U-shaped cross-section having a predetermined thickness and is subsequently supplied continuously into the curing apparatus 10 best shown in FIG. 2.

The SMC sheet 6 entering the entry opening 21 of the curing apparatus 10 is first passed through the first curing zone Z1. Since the cross-section of the cavity 12A is chosen to be larger than the cross-section of the SMC sheet 6 so as to provide a clearance, the SMC sheet 6 can be smoothly supplied into the cavity 12A between the upper and lower molds 13 and 14.

Since the clearance exists at the entry side of the cavity 12A, the SMC sheet 6 is heated by radiation. However, as the SMC sheet 6 being transported through the cavity 12A approaches the exit end b of the first curing zone Z1, the clearance decreases and, therefore, the SMC sheet 6 slidingly contacts the molding faces 13a and 14a wherefor heat is directly conducted from the molds to the SMC sheet 6 to heat the latter. Due to the heating within the first curing zone Z1, the SMC sheet 6 is cured and, by the time it reaches the exit end b, the SMC sheet 6 comes has attained a rigidity.

The SMC sheet 6 having passed through the cavity 12A in the first curing zone Z1 subsequently enters the second curing zone Z2 in which the SMC sheet 6 is heated for a predetermined length of time.. As the SMC sheet 6 is heated in the second curing zone Z2, the SMC sheet 6 undergoes a thermal expansion as shown in FIG. 11 and then comes to slidingly contact the respective molding faces 15a and 16a of the upper and lower molds 15 and 16. Since the molding face 16a of the lower mold 16 is fixed in position while the upper mold 15 is movable, the thermal expansion of the SMC sheet 6 having a sufficient rigidity causes the upper mold 15 to shift upwardly against the balancing coil springs 29 and 30 to accommodate such thermal expansion.

While the upper mold 15 shifts upwardly as the thermal expansion of the SMC sheet 6 progresses, the upper mold reaches an upwardly shifted limit when the thermal expansion of the SMC sheet 6 attains a peak, followed by shrinkage of the SMC sheet 6. As the SMC sheet 6 shrinks, the upper mold having reached the upwardly shifted limit is shifted downwardly by the effect of the composite spring force of the balancing coil springs 29 and 30 to allow the upper mold 15 to follow the shrinkage of the SMC sheet 6.

It is to be noted that, since the SMC sheet 6 is continuously transported through the cavity 12B between the upper and lower molds 15 and 16, the thermal expansion of the SMC sheet 6 is greatest at a location spaced a predetermined distance inwardly from the entry end and, as the SMC sheet 6 is moved past such location, thermal shrinkage takes place in the SMC sheet 6, with the thermal expansion and shrinkage consequently being depicted by respective curves similar to each other. Accordingly, the amount of displacement of the upper mold 15 displaceable with a change in volume of the SMC sheet 6 is substantially constant at the same location, allowing the upper mold 15 to be maintained as though retained at a constant position.

Since the SMC sheet 6 has been shaped by the shaping apparatus 3 to the predetermined shape, application of a pressure to the SMC sheet 6 in the curing apparatus is not desirable. However, in the curing apparatus 10 embodying the present invention, the movable upper mold 15 is biased by an extremely low pressure, or a null pressure, created by the balancing coil springs 29 and 30 and, therefore, the movable upper mold 15 can move in accordance with a change in volume of the SMC sheet 6 without imposing any excessive load thereon. In other words, the movable upper mold 15 can, while constantly slidingly contacting the SMC sheet 6, move up and down repeatedly to follow the volumetric change of the SMC sheet 6.

One of the opposite surface of the SMC sheet 6 which contacts the molding face 15a of the upper mold 15 provides an excellent surface appearance of a final product obtained from the completely cured SMC sheet 6 and, therefore, the surface can be made smooth by allowing the SMC sheet 6 to slidingly contact the molding face 15a of the movable upper mold 15 at all times.

On the other hand, as the SMC sheet 6 undergoes the thermal expansion within the second curing zone Z2, a frictional force is developed between the molding face 16a of the lower mold 16 and the SMC sheet 6 then slidingly contacts the molding face 16a. This frictional force may hamper a smooth movement of the SMC sheet 6 through the cavity 12B. Because of this, the plural support rollers 35 are accommodated within the recess 16b in the lower mold 16 along the molding face 16a so that the top portions of these support rollers 35 can contact the lower surface of the SMC sheet 8 in a line contact fashion to thereby minimize the generation of the frictional force and, hence, to facilitate a smooth movement of the SMC sheet 8 through the cavity 12B. Accordingly, the SMC sheet 8 can be smoothly moved through the cavity 12B in the second curing zone Z2 as it is pushed from the shaping apparatus 3.

When the amount of thermal shrinkage of the SMC sheet 6 attains a predetermined value subsequent to the thermal shrinkage thereof, little change in volume occurs in the SMC sheet 6. At this time, the SMC sheet 6 emerges outwardly from the second curing zone Z2 and enters the third curing zone Z3 as shown in FIGS. 8 and 9.

As hereinbefore described, the cavity 12C in the third curing zone Z3 has a uniform cross-sectional shape from the entry end c' to the exit end d. During the continuous passage of the SMC sheet 6 through the cavity 12C in the third curing zone Z3, the opposite surfaces of the SMC sheet 6 which then no longer undergo a change in volume are held in sliding contact with the respective molding faces 17a and 18a of the upper and lower molds 17 and 18 to receive heat from the sheath heaters 26. By so doing, the SMC sheet 6 is completely cured as it emerges outwardly from the exit end d of the cavity 12C in the third curing zone Z3, that is, the exit opening 22 of the curing apparatus 10.

From the foregoing description of the preferred embodiment of the present invention, it has now become clear that, in the curing apparatus for curing the continuous sheet molding compound such as SMC material shaped by the shaping apparatus, at least one of the molds at which the sheet molding compound undergoes a change in volume as a result of cyclic thermal expansion and shrinkage is employed in the form of a movable mold to accommodate such characteristic of the sheet molding compound, and thus the possibility of application of an excessive load to the sheet molding compound can be eliminated advantageously. Therefore, without destroying the predetermined shape of the sheet molding compound defined by the shaping apparatus installed at a stage preceding the curing apparatus, the reinforcement fibers contained in the sheet molding compound can be ideally maintained as oriented.

Also, it is possible to allow the molding face of the movable mold to slidingly contact the surface of the sheet molding compound at all times and, therefore, where such surface of the sheet molding compound is used as an excellent surface appearance of the eventually obtained product, an authentically excellent surface appearance can be obtained.

Moreover, since at the entry side of the curing apparatus the cross-sectional shape of the cavity is so designed as to be larger than the cross-section of the sheet molding compound to provide a sufficient clearance, the sheet molding compound can smoothly be transported therethrough as it is pushed. Yet, in the second curing zone at which the sheet molding compound attains a sufficient rigidity and also undergoes the maximum thermal expansion, one of the molds is supported for movement towards and away from the other of the molds and employs a plurality of support rollers and, therefore, the friction between the sheet molding compound and any one of the molds can advantageously be reduced to facilitate a smooth movement of the sheet molding compound as it is pushed.

Figure 10:
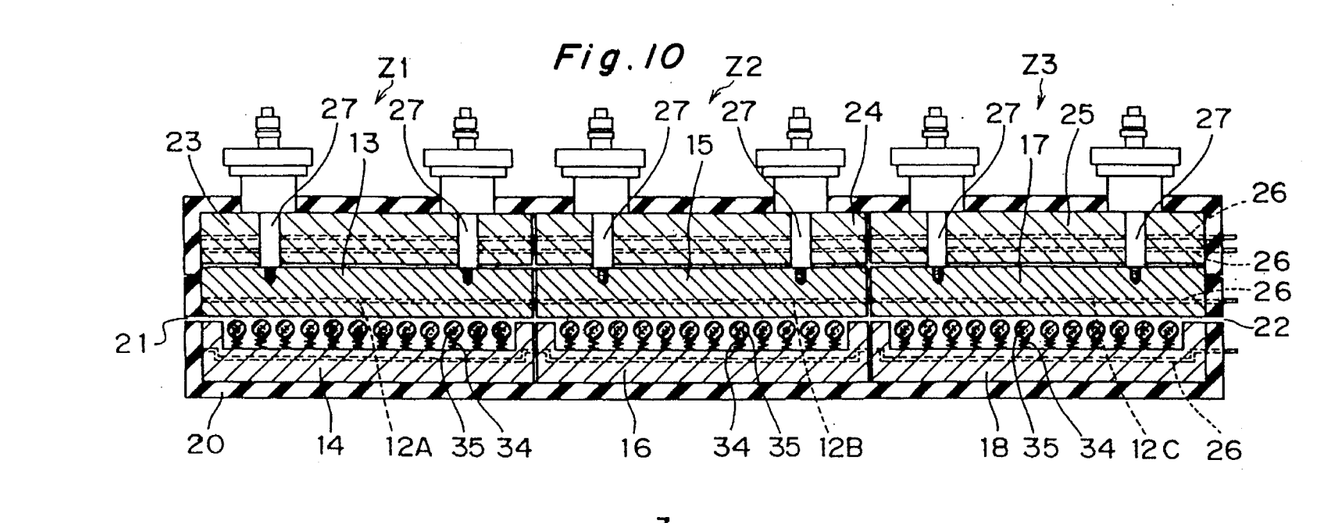
FIG. 10 is a longitudinal sectional view of a modified form of the curing apparatus.

Although the present invention has been described in connection with the preferred embodiments thereof with reference to the accompanying drawings, it is to be noted that various changes and modifications will be apparent to those skilled in the art. For example, although in the foregoing embodiment of the present invention the upper molds 13 and 17 in the first and third curing zones Z1 and Z3 have been shown and described as fixed in position, they may be supported for movement in a direction towards and away from the associated lower molds 14 and 18 in a manner similar to the upper mold 15 in the second curing zone Z2 as shown in FIG. 10, and they may optionally be provided with support rollers mounted in the lower molds 14 and 18 in a manner similar to those in the lower mold 16 in the second curing zone Z2.

Also, the use of the support rollers 35 in the second curing zone Z2 is not always essential in the practice of the present invention.

A mechanism for movably supporting the upper mold in the second zone Z2 is not limited to the type wherein the balancing coil springs 29 and 30 are employed as shown and described, and any suitable mechanism capable of allowing the upper mold in the second curing zone Z2 to follow the volumetric change of the sheet molding compound may be employed.

Accordingly, such changes and modifications are to be understood as included within the scope of the present invention as defined by the appended claims, unless they depart therefrom.

What is claimed is:

1. A curing apparatus for use in curing a sheet molding compound which has been formed in a predetermined shape by a shaping device, said curing apparatus comprising:

a first pair of molds disposed along and on opposing sides of a path of transport of the sheet molding compound;

a curing heater operably mounted along said path of transport of the sheet molding compound;

wherein said molds define therebetween a sheet molding compound-receiving cavity;

wherein one of said molds is movable towards and away from the other of said molds so as to constitute a means for automatically changing a cross-sectional shape of said cavity when the sheet molding compound is present in said cavity and undergoes thermal expansion or contraction;

wherein at least one biasing element is provided and elastically biases, toward said cavity, the one of said molds which is movable toward and away from the other of said molds; and wherein said at least one biasing element comprises a first coil spring biasing said one of said molds toward said cavity, and a second coil spring biasing said one of said molds away from said cavity.

2. A curing apparatus as recited in claim 1, further comprising at least one additional pair of molds disposed along and on opposing sides of the path of transport of the sheet molding compound.

3. A curing apparatus as recited in claim 2, wherein said at least one additional pair of molds comprises a second pair of molds and a third pair of molds, each of which defines therebetween a sheet molding compound-receiving cavity;

said second pair of molds defines a first curing zone, said first pair of molds defines a second curing zone and said third pair of molds defines a third curing zone; and said first, second and third curing zones are disposed successively along a downstream direction of the path of transport of the sheet molding compound.

4. A curing apparatus as recited in claim 3, wherein said cavities of said first, second and third curing zones are in communication with one another so as to define a continuous sheet molding compound transport passage.

5. A curing apparatus as recited in claim 4, wherein opposing surfaces of said second pair of molds converge toward one another along the downstream direction such that said cavity of said first curing zone narrows along the downstream direction.

6. A curing apparatus as recited in claim 4, wherein said third pair of molds are fixed in position relative to one another, and said cavity of said third curing zone has a uniform cross section along its entire length.

7. A curing apparatus as recited in claim 1, wherein said first pair of molds comprises an upper mold and a lower mold respectively having opposing cavity-defining surfaces;

one of said upper and lower molds is movable relative to the other of said upper and lower molds; and the other of said upper and lower molds comprises a plurality of juxtaposed support rollers having supporting surfaces aligned in a common plane and constituting at least part of said cavity-defining surface of said other of said upper and lower molds.

8. A curing apparatus as recited in claim 7, wherein said other of said pair of said upper and lower molds further comprises a plurality of elastic elements elastically yieldably supporting said plurality of support rollers, respectively.

9. A curing apparatus as recited in claim 3, wherein said heater is embedded in one of said molds of one of said first, second and third pairs of molds.

10. A curing apparatus as recited in claim 9, wherein said heater comprises a sheath heater.

11. A curing apparatus as recited in claim 9, wherein said heater comprises a means for circulating pressurized steam.

12. A curing apparatus as recited in claim 9, wherein said heater comprises a means for circulating heated oil.

13. A curing apparatus for use in curing a sheet molding compound which has been formed in a predetermined shape by a shaping device, said curing apparatus comprising:

a mold housing;

a first pair of molds mounted to said mold housing and disposed along and on opposing sides of a path of transport of the sheet molding compound;

a curing heater operably mounted along said path of transport of the sheet molding compound;

wherein said molds define therebetween a sheet molding compound-receiving cavity;

wherein one of said molds is movably mounted to said mold housing, by at least one elastically yieldable member, for freely elastically yieldable movement towards and away from the other of said molds; and wherein said at least one elastically yieldable member comprises a first coil spring biasing said one of said molds toward said cavity, and a second coil spring biasing said one of said molds away from said cavity.

14. A curing apparatus as recited in claim 13, further comprising at least one additional pair of molds disposed along and on opposing sides of the path of transport of the sheet molding compound;

wherein said at least one additional pair of molds comprises a second pair of molds and a third pair of molds, each of which defines therebetween a sheet molding compound-receiving cavity;

wherein said second pair of molds defines a first curing zone, said first pair of molds defines a second curing zone and said third pair of molds defines a third curing zone;

wherein said first, second and third curing zones are disposed successively along a downstream direction of the path of transport of the sheet molding compound; and wherein said cavities of said first, second and third curing zones are in communication with one another so as to define a continuous sheet molding compound transport passage.

15. A curing apparatus as recited in claim 14, wherein opposing surfaces of said second pair of molds converge toward one another along the downstream direction such that said cavity of said first curing zone narrows along the downstream direction.

16. A curing apparatus as recited in claim 13, wherein said first pair of molds comprises an upper mold and a lower mold respectively having opposing cavity-defining surfaces;

one of said upper and lower molds is movable relative to the other of said upper and lower molds; and the other of said upper and lower molds comprises a plurality of juxtaposed support rollers having supporting surfaces aligned in a common plane and constituting at least part of said cavity-defining surface of said other of said upper and lower molds.

17. A curing apparatus as recited in claim 16, wherein said other of said pair of upper and lower molds further comprises a plurality of elastic elements elastically yieldably supporting said plurality of support rollers, respectively.

* * * * *